United States Patent [19]
Quan et al.

[11] Patent Number: 5,605,308
[45] Date of Patent: Feb. 25, 1997

[54] SPACE VEHICLE DISPENSER

[75] Inventors: Gary Quan, Fountain Valley; John A. Carlson, Huntington Beach; Alan H. Wilkins, Irvine; Leo Rosadiuk, Torrance; Sam Carter, Orange; George Budris, Westminster, all of Calif.

[73] Assignee: McDonnell Douglas Corp., Huntington Beach, Calif.

[21] Appl. No.: 254,613

[22] Filed: Jun. 6, 1994

[51] Int. Cl.⁶ .................................................. B64G 1/10
[52] U.S. Cl. ............................... 244/158 R; 244/137.1; 102/489
[58] Field of Search .................... 244/158 R, 161, 244/137.1, 137.4; 102/489, 393, 394, 703, 480; 89/1.801, 1.803, 1.8

[56] References Cited

U.S. PATENT DOCUMENTS

| | | |
|---|---|---|
| 2,925,965 | 2/1960 | Pierce . |
| 2,958,260 | 11/1960 | Anderson . |
| 3,712,229 | 1/1973 | Schock . |
| 3,907,225 | 9/1975 | Welther ............................ 244/158 R |
| 3,948,175 | 4/1976 | Bucklisch . |
| 4,044,974 | 8/1977 | Lingley et al. ...................... 244/161 |
| 4,067,308 | 1/1978 | Andersen et al. ................ 244/158 R |
| 4,106,389 | 8/1978 | Walley . |
| 4,233,882 | 11/1980 | Eichweber . |
| 4,298,178 | 11/1981 | Hujsak ............................ 244/161 |
| 4,372,216 | 2/1983 | Pinson et al. . |
| 4,444,117 | 4/1984 | Mitchell, Jr. . |
| 4,506,852 | 3/1985 | Adams et al. ..................... 244/161 |
| 4,625,646 | 12/1986 | Pinson . |
| 4,679,752 | 7/1987 | Wittmann et al. .............. 244/158 R |
| 4,957,046 | 9/1990 | Puttock . |
| 5,040,748 | 8/1991 | Torre et al. ........................ 244/161 |
| 5,125,601 | 6/1992 | Monford, Jr. ...................... 244/161 |
| 5,199,672 | 4/1993 | King et al. ..................... 244/158 R |
| 5,411,226 | 5/1995 | Jones et al. ....................... 244/161 |

FOREIGN PATENT DOCUMENTS 3-287500  12/1991  Japan .................... 244/161

*Primary Examiner*—Galen L. Barefoot
*Attorney, Agent, or Firm*—D. Stout

[57] ABSTRACT

A dispenser is disclosed for ejecting space vehicles from a launch vehicle. The dispenser includes an inverted outer truncated cone and an upright inner truncated cone positioned within the outer cone and connected thereto at lower end portions thereof. The cones are mounted on the launch vehicle. The dispenser also includes a mounting platform secured to the outer cone and inner cone at upper end portions thereof. Hinges detachably pivotally mount the space vehicles on the mounting platform, and separation nuts and bolts releasably secure the vehicles to the platform. Spring actuators mounted in the platform provide pivoting of all or any individual vehicle relative to the mounting platform resulting in separation and ejection of the vehicles from the launch vehicle.

21 Claims, 7 Drawing Sheets

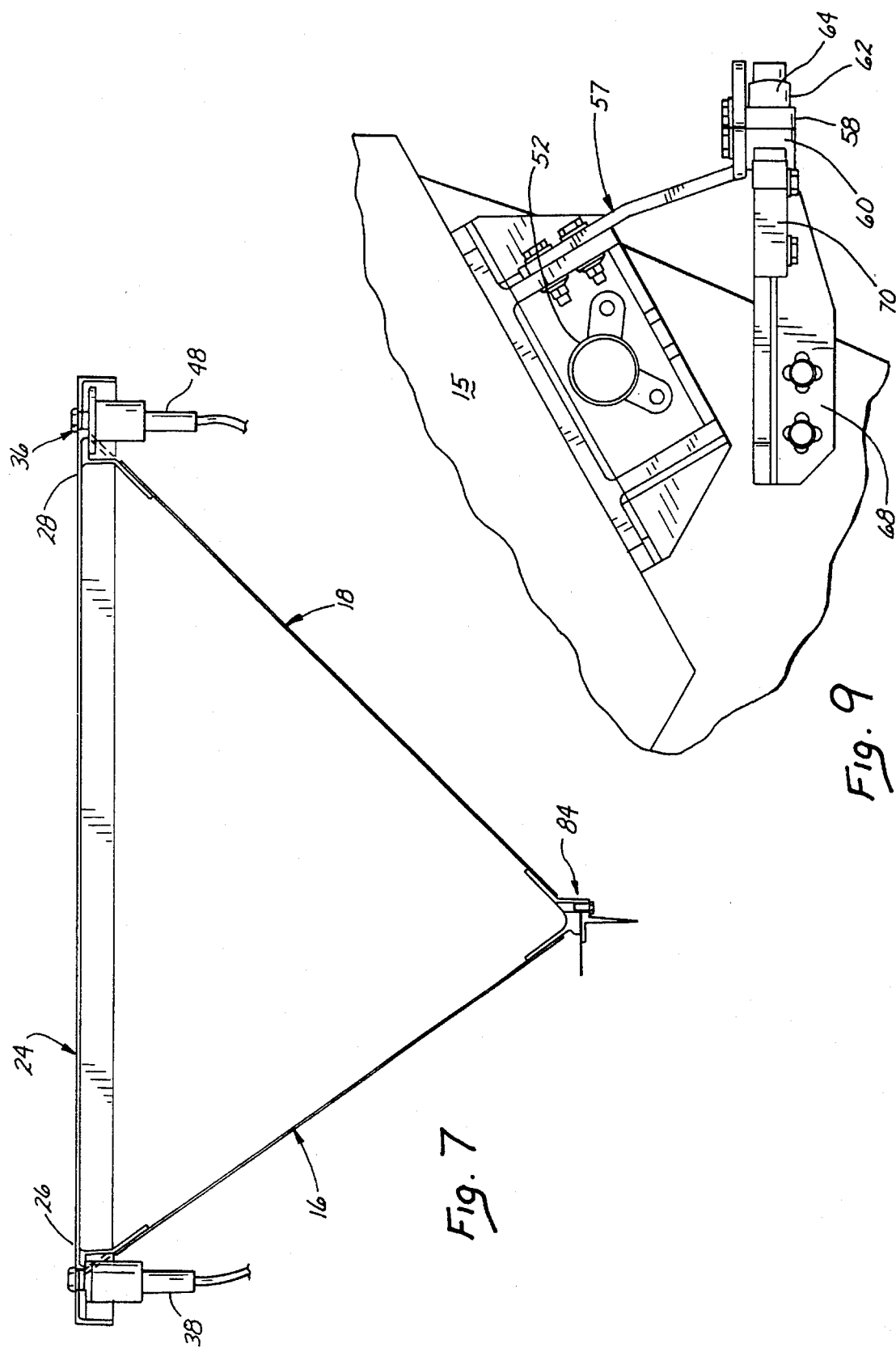

SPACE VEHICLE DISPENSER

BACKGROUND OF THE INVENTION

The invention generally relates to a dispenser for dispensing vehicles from a carrier and, more particularly, to a dispenser for dispensing multiple spacecraft from a launch vehicle.

Many launch vehicles utilized to carry a payload into outer space have been designed to carry a plurality of such payloads in order to minimize the launch costs of the payload. This not only reduces total fuel expenditure costs but also enables a single launch vehicle to place a plurality of satellites into orbit, thereby making such space-based systems such as satellites more cost-effective for commercial use.

Many conventional missiles are capable of ejecting multiple warheads or submissiles therefrom when proximal to a target in order to mole effectively and/or completely destroy the target. An example of such a missile is disclosed in U.S. Pat. No. 3,712,229 to Schock. The Schock system includes a plurality of segments mounted in the nose cone of the missile which are capable of rotating approximately 170 degrees in order to allow projectiles to be ejected from the nose cone by the high degree of rotation of the segments. The Schock missile system includes levers having pins which slide in slots provided in the missile casing to produce the rotation of the missile segments. However, a disadvantage of the Schock system is that the centrifugal forces which are required to eject the projectiles in the lever/pin arrangement are not sufficiently consistent or predictable to provide sufficient precision for use in dispensing space vehicles such as satellites, etc. In addition, the Schock system requires a headwind striking the missile in flight to produce the radial rotation of the segments outward for ejection of the projectiles. However, a headwind is not available in systems designed for space use. In addition, the systems necessary to produce rotation of the missile required to effect the centrifugal force ejection of the projectiles would significantly add to both the complexity and weight of the space vehicle system.

Other prior art missile systems provide individual ejection of submissiles therefrom. An example of such a prior art missile system is disclosed in U.S. Pat. No. 4,625,646 to Pinson. The Pinson system uses a gas-operated piston which rotates a pivoted tube outwardly to permit ejection of the submissile away from the carrier missile. A restraint structure is provided to limit the degree of movement of the launching tube when in its activated position. However, a primary disadvantage of the Pinson system is that it requires a power-generating means such as a gas-generating device or a pyrotechnic charge to perform the desired ejection of the submissiles and rotation of the launch tube. Such power-generating subsystems may involve or require undue amounts of power and/or result in contamination of the surrounding space environment which may impair performance of sensitive computer and other systems in the space vehicle.

What is therefore needed is a dispenser system using passive space vehicle release subsystems and separation structures which do not release fragments thereof into the environment. In addition, such a dispenser system is also needed which does not produce contaminants such as combustion products.

SUMMARY OF THE INVENTION

It is a principal object of the present invention to provide a dispenser system for space vehicles which does not require complex mechanisms for operation thereof.

It is also an object of the present invention to provide a dispenser system for space vehicles which is generally contaminant-free.

It is also an object of the present invention to provide a dispenser system for space vehicles which has sufficient structural strength and rigidity to securely retain the space vehicles' structural integrity with minimum weight penalty.

It is an object of the present invention to provide a dispenser system for space vehicles which is capable of selectively dispensing a plurality of space vehicles therefrom.

It is an object of the present invention to provide a dispenser system for splice vehicles which is capable of selectively dispensing a plurality of space vehicles therefrom regardless of the failure of any of the other space vehicles to be dispensed.

It is an object of the present invention to provide a dispenser system for splice vehicles which allows operational testing thereof prior to actual use.

It is also another object of the present invention to provide a dispenser system for space vehicles which is mechanically simple in construction and operation in order to provide a high degree of reliability.

The dispenser system of the present invention is specifically designed for use in ejecting many types of space vehicles from a single launch vehicle while in outer space in order to place satellites into orbit as well as to accomplish other types of space missions. Since the launch vehicle and the space vehicles typically contain computer systems, instruments and other subsystems which may be sensitive to shocks and environmental contaminants, the dispenser is designed so that it does not produce any substantial degree of shock during its deployment phase of operation. Minimizing shock is accomplished by utilizing simple mechanical springs to move components of the dispenser into desired positions thereby resulting in deployment of the space vehicles into the desired trajectory. Commercially available pyrotechnic devices are used to disconnect the space vehicles from the dispenser. These pyrotechnic devices are small, highly reliable and produce relatively low levels of shock in comparison to prior art dispenser systems that utilize pyrotechnic devices to fracture relatively large (or relatively numerous) connecting structures which may impart a relatively high degree of shock to the space vehicle and launch vehicle. Thus, such prior art dispenser systems typically adversely affect sensitive subsystems of the space and launch vehicles. In addition, pyrotechnic devices utilized in prior art systems may also produce significant amounts of contaminants which may also adversely affect sensitive subsystems of the space vehicle and launch vehicle. In contrast, the pyrotechnic devices utilized in the present invention use bolt catchers so that the securement means do not contaminate the environment with fragments and also place the explosive charges in containers so that the devices do not contaminate the environment with combustion products.

The dispenser system includes inner and outer support structures interconnected at lower portions thereof and mounted on a suitable upper structural portion of a launch vehicle. A mounting platform is positioned at and connected to upper edge portions of the inner and outer structures. The space vehicles are individually connected to the mounting platform by means of releasably securing means such as separation nuts fastened to bolts which interconnect the space vehicles and the mounting platform. Since the separation nuts are fired using minimal power requirements and without producing any combustion products, the system does not produce a significant amount of contaminant and does not entail a significant amount of power consumption.

A detachable hinge is also utilized to individually mount each of the space vehicles to the platform. Relative pivotal movement between the space vehicles and the platform detaches the hinge connection between the space vehicles and the platform after a predetermined degree of angular motion thereby providing separation of the space vehicles and the platform and allowing ejection of the space vehicles from the platform (and launch vehicle). A spring actuator is provided to individually pivot each of the space vehicles into a angular position in which the hinge members detach from each other, and the hinge thereby detaches the interconnection it provides between the space vehicle and the dispenser (as well as the launch vehicle). The actuators are preferably mounted on the platform and positioned below the space vehicles and utilize a plunger engaging the space vehicles. Since the actuators essentially push and pivot the space vehicles into the desired position of detachment, there is essentially no power required for such pivoting and detachment, and they are thus accomplished generally passively. Moreover, once the pivoting of the space vehicle results in detachment from the platform (and launch vehicle or other type of carrier), the rotational movement of the space vehicle continues thereby providing ejection of the space vehicles from the platform and launch vehicle.

The mounting platform is generally rigid and has a relatively high degree of structural strength in order to securely retain each of the space vehicles at a desired position on the launch vehicle. The rigidity of the platform provides more even distribution of the point load forces (of the space vehicles) onto the support structures thereby generally preventing high structural peak stress damage thereto.

The system is preferably composed of high strength materials such as composites, steel or other suitable materials in order to have sufficient structural strength to support a plurality of space vehicles which may be very heavy. In addition, the system has relatively few component parts and is generally simple in construction and operation and, therefore, provides a relatively high degree of reliability. Moreover, since the dispenser of the present invention does not rely on a headwind for operation thereof as in some prior art systems, it may be operated and/or tested prior to use quickly, easily and inexpensively.

BRIEF DESCRIPTION OF THE DRAWINGS

FIG. 7 is a sectional view of the mounting platform, support structures and connection ring of the dispenser system of the present invention.

FIG. 9 is a top view of the detachable hinge of the dispenser system of the present invention showing the hinge connected to a portion of the space vehicle and to a portion of the mounting platform of the dispenser.

DETAILED DESCRIPTION OF THE PREFERRED EMBODIMENT

Figure 1:
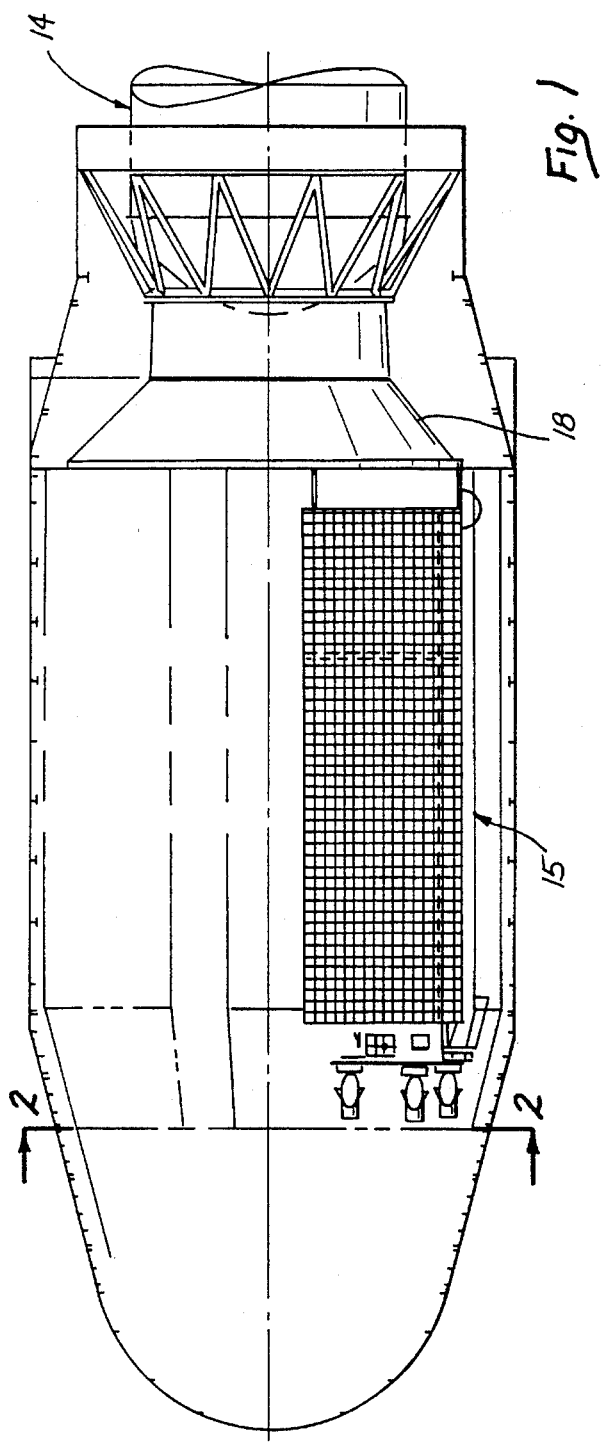
FIG. 1 is a longitudinal sectional view of the dispenser system of the present invention mounted on a launch vehicle and showing a space vehicle mounted on the dispenser.
Figure 2:
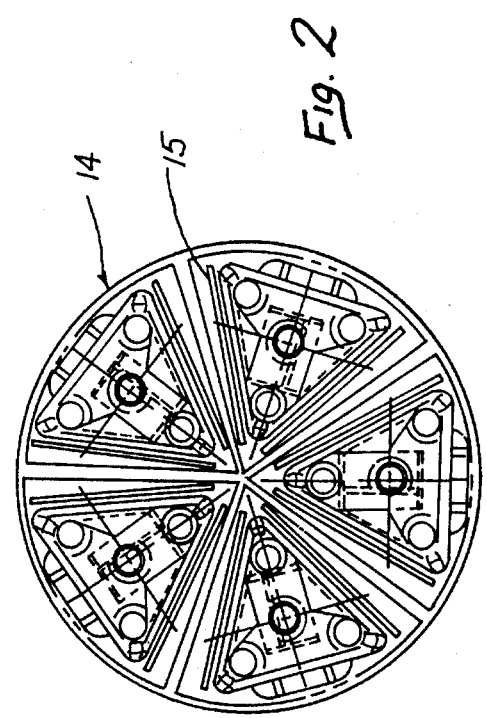
FIG. 2 is a cross-sectional view of the dispenser system of the present invention taken along lines 2—2 of the launch vehicle of FIG. 1 showing segments thereof and the space vehicles mounted on the launch vehicle.
Figure 6:
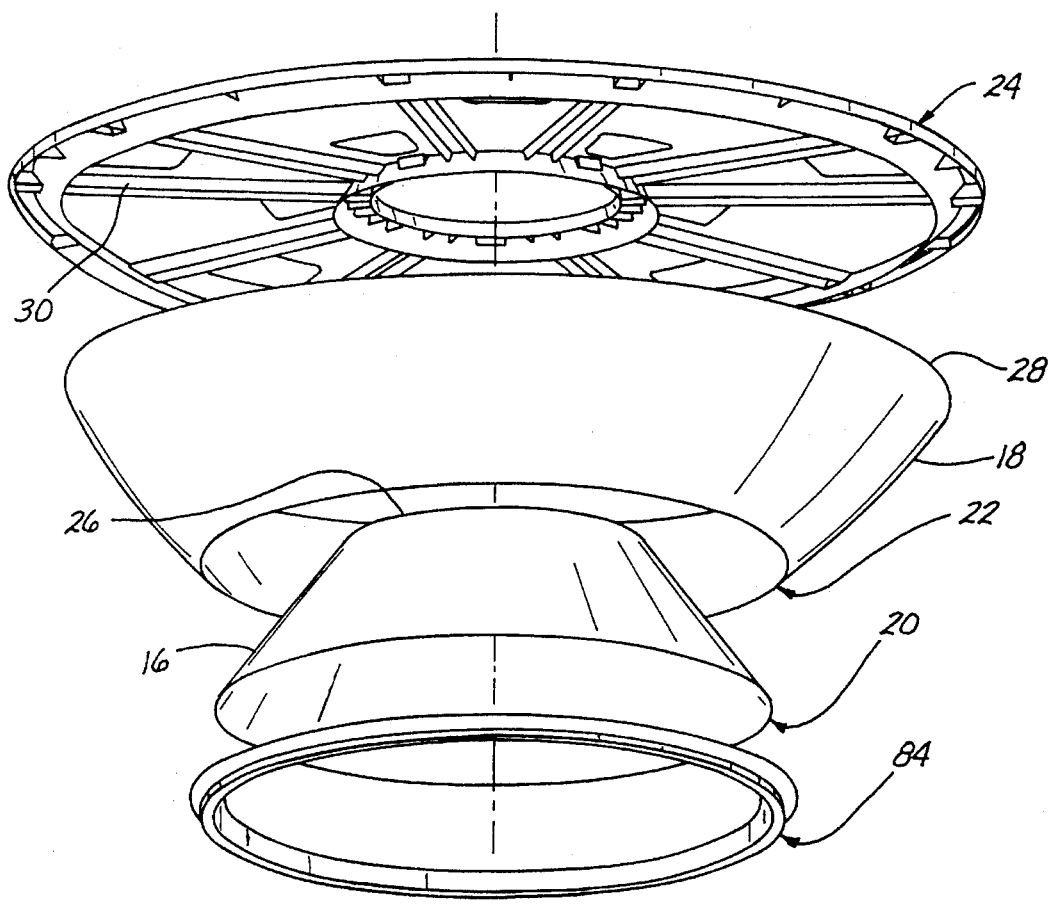
FIG. 6 is an exploded perspective view of the mounting platform, support structures and connection ring of the dispenser system of the present invention.
Figure 4:
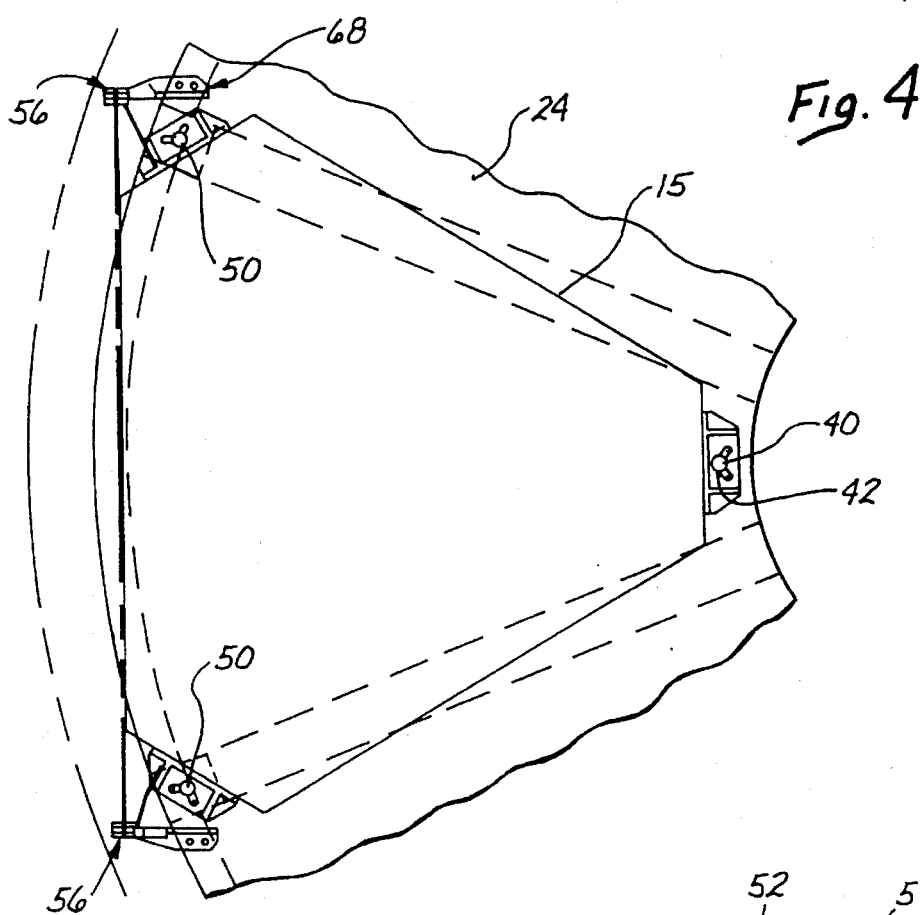
FIG. 4 is a top view of a portion of the dispenser of the present invention showing a lower portion of the space vehicle mounted on and secured to the mounting platform of the dispenser and illustrating components thereof.
Figure 5:
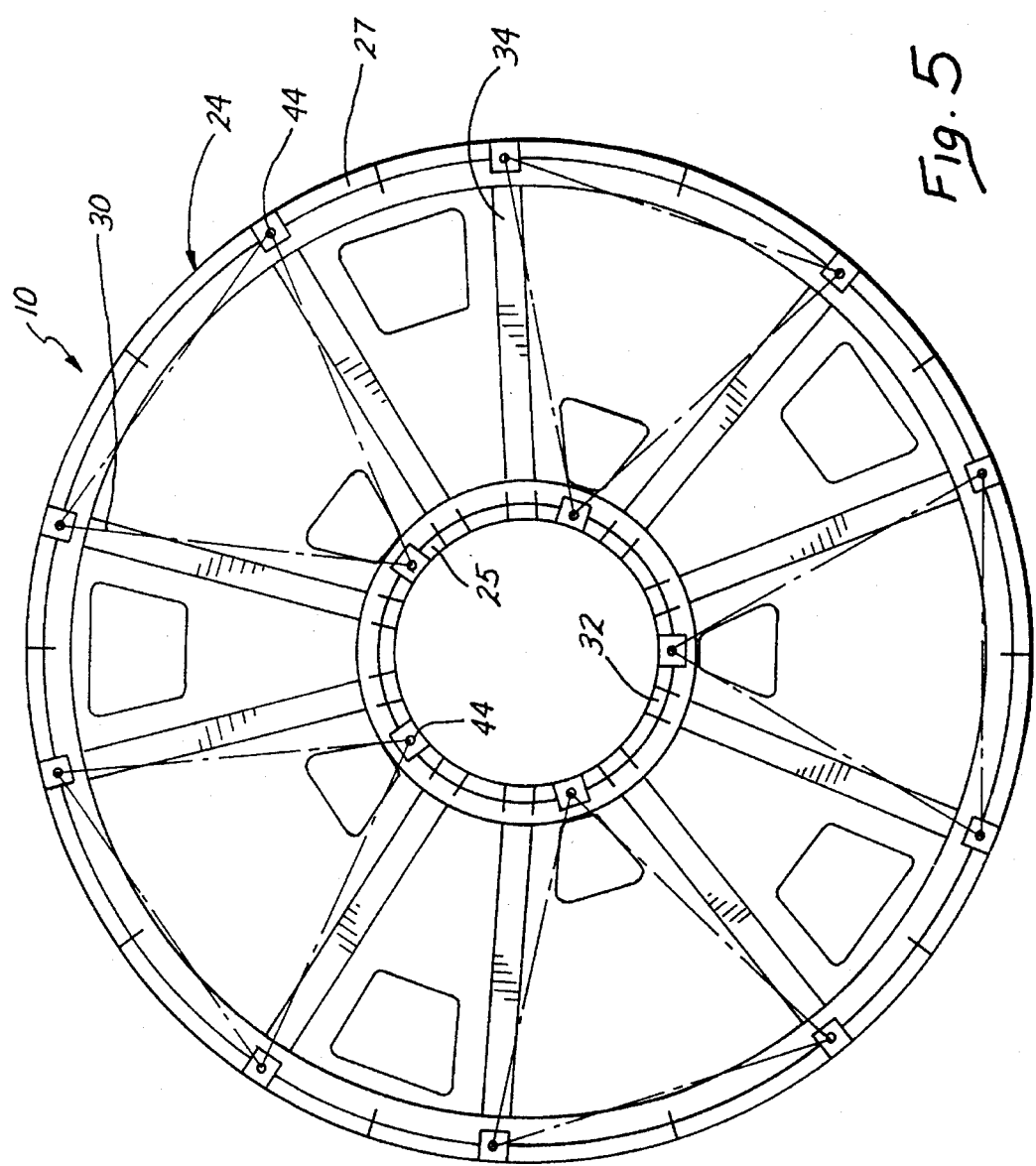
FIG. 5 is a bottom view of the mounting platform of the dispenser of the present invention with a plurality of space vehicles mounted thereon and shown in phantom in order to illustrate the relative positions of the mounting platform and space vehicles prior to ejection.
Figure 8A:
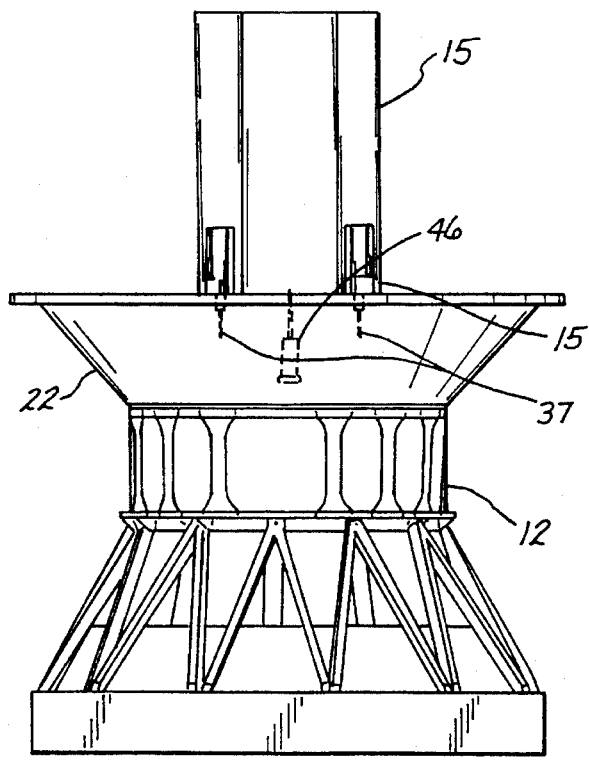
FIG. 8A is a rear view of the dispenser system of the present invention and an upper structural section of the launch vehicle showing a space vehicle mounted on the dispenser and secured thereto.

Referring to the drawings, the dispenser system of the present invention is generally designated by the numeral 10 (FIG. 5). The dispenser 10 is preferably mounted on an upper structural portion 12 (FIG. 8A) of a launch vehicle or missile (or other suitable type of carrier) 14 (FIG. 1). The dispenser 10 preferably includes an inner support structure 16 (FIG. 6) which is preferably an inner truncated cone 16. The dispenser 10 preferably also includes an outer support structure 18 which is preferably an outer truncated cone 18. Inner cone 16 is preferably positioned within outer cone 18, and cones 16 and 18 are securely connected at lower edge portions 20 and 22 thereof to a connection ring 84. The connection ring 84 is secured to the upper structural portion 12 of the launch vehicle 14. The connection ring 84 is preferably a generally rigid unitary structure in order to more evenly distribute point load forces to the launch vehicle 14. The outer cone 18 is preferable inverted whereas inner cone 16 is preferably upright, as shown in FIG. 6.

The dispenser 10 preferably includes a mounting platform 24 which is positioned at the upper edge portions 26 and 28 (FIG. 6) of the inner and outer cones 16 and 18 and securely mounted thereon. The platform 24 preferably includes pairs of struts 30 having inner end portions 32 and outer end portions 34, as shown in FIG. 5. The inner end portions 32 are preferably connected to the inner portions (or inner rings) 25 of the platform 24, and the outer end portions 34 are preferably connected to the outer circumferential portions (or outer rings) 27 of the platform 24 so that the struts 30 are generally positioned between the edge portions 26 and 28 when the mounting platform 24 is mounted on the cones 16 and 18. The struts 30 and rings 26 and 28 are preferably integral and preferably machined from a single piece so that the mounting platform 24 is preferably a unitary structure. However, alternatively, the struts 30 may be connected to the rings 25 and 27 by rivets or any other suitable connection means, if desired. The mounting platform is preferably a generally rigid structure in order to more evenly distribute point load forces from the space vehicles to the cones 16 and 18. The struts 30 of each pair thereof preferably extend outwardly from the longitudinal axis of the launch vehicle 14 and diverge outwardly from each other so that each of the struts 30 forms a radial spoke configuration between the portions 25 and 27, as shown in FIGS. 5 and 6.

Figure 3:
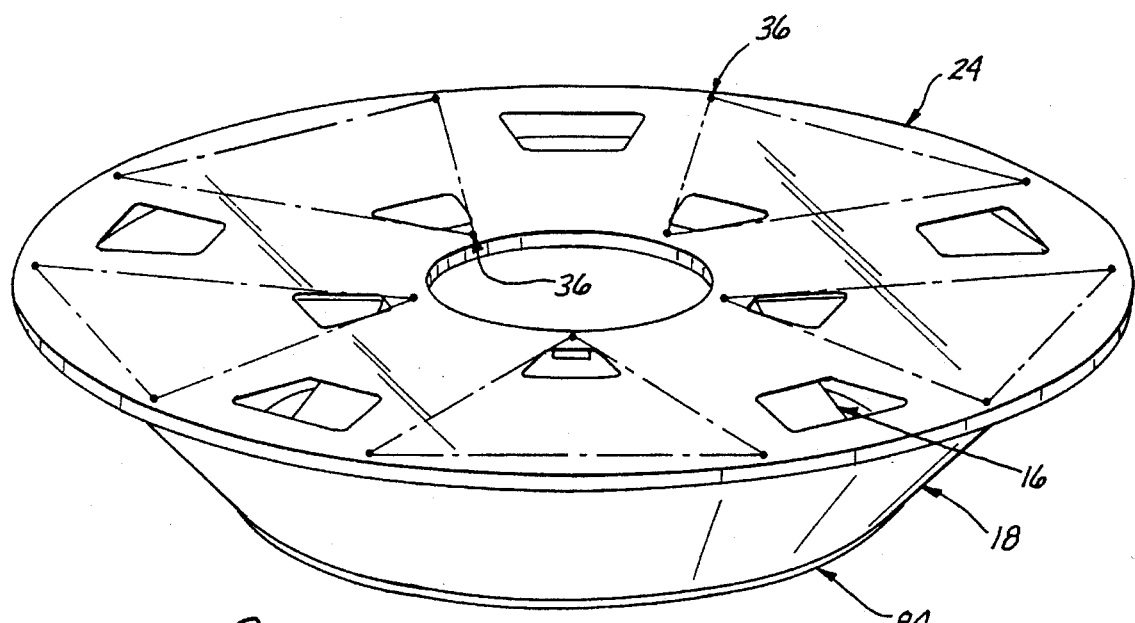
FIG. 3 is a perspective view of the mounting platform and other components of the dispenser system of the present invention.

When the dispenser 10 is connected to the upper structural portion 12, the mounting platform 24 is preferably oriented so that it is generally normal to the longitudinal axis of the launch vehicle 14 so that the space vehicles 15 mounted thereon are positioned generally parallel to the longitudinal axis of the missile. The platform 24 also is preferably provided with (preferably conical) connection bushings 36 (FIG. 3) at an upper surface thereof for connecting the space vehicles 15 to the platform 24.

Figure 8B:
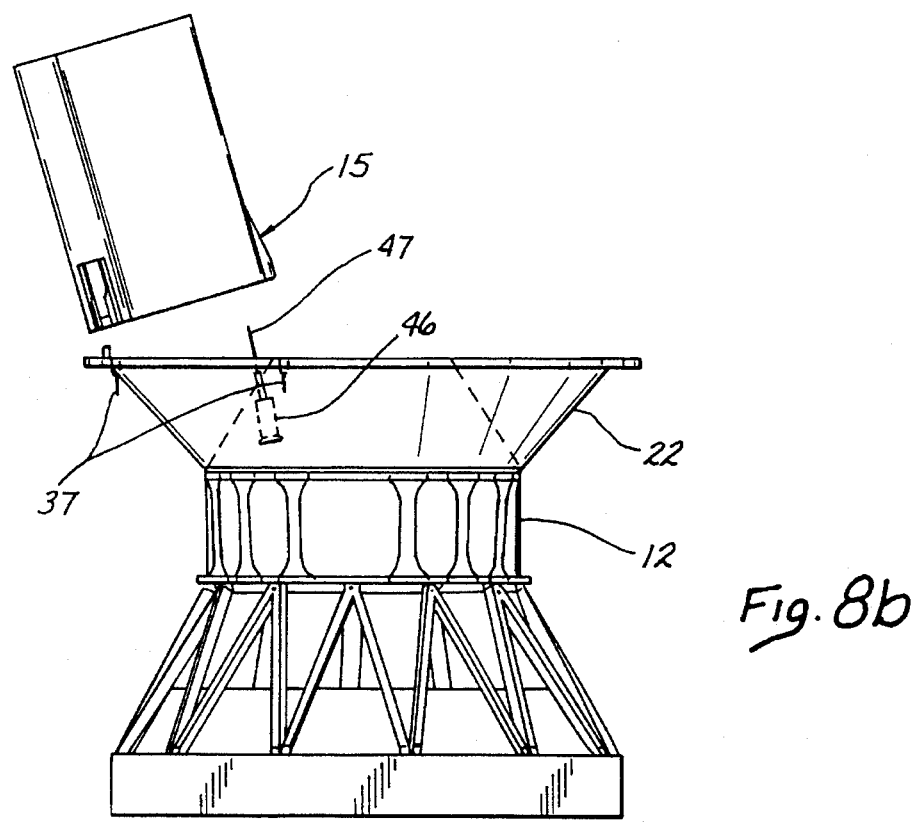
FIG. 8B is a side view of the dispenser system of the present invention and an upper structural section of the launch vehicle showing the space vehicle pivoted relative to the mounting platform of the dispenser and being ejected therefrom.

The space vehicles 15 are preferably individually releasably secured to the mounting platform 24 via a means for releasably securing 37 (FIG. 8B), which includes a first set of separation nuts and separation bolts (not shown). The separation bolts 40 preferably are inserted in apertures 44 (FIG. 5) in the platform 24 preferably located at the inner portion 25. The releasably securing means 37 also preferably includes a second set of separation nuts and separation bolts (not shown). The separation bolts 50 are preferably inserted in apertures 44 in the platform 24 preferably located at the outer circumferential portion 27. The separation nuts 38 and 48 may be detached from the bolts 40 and 50 by means of a pyrotechnic device (not shown) located within the nuts 38 and 48 which is capable of being fired to separate the threads of the nuts 38 and 48 from the threads of the bolts 40 and 50. This, in effect, severs the securement of the vehicle 15 to the platform 24. Once the nuts 38 and bolts 40 are separated from each other, a first set of bolt catchers 42 mounted in the space vehicles 15 catches and contains the bolts 40 thereby preventing environmental contamination. Similarly, once the nuts 48 and bolts 50 are separated from each other, a second set of bolt catchers 52 mounted in the space vehicles 15 catches and contains the bolts 50 thereby preventing environmental contamination.

Since the pyrotechnic device of the separation nut 38 only disconnects the nut 38 from the bolt 40, it may be very small in size and the amount of energy it requires may be very small. Consequently, its contamination by-products are concomitantly minimal. In addition, the pyrotechnic device is preferably self contained so that the combustion products thereof are contained in the device and do not enter the environment. The separation nuts 38 and 48 are preferably capable of being selectively individually fired by means of their connection to and operation by a suitable controller (not shown).

There are preferably a set of spring actuators 46 (FIG. 8B) mounted in the mounting platform 24 preferably at the inner portion 25. Each of the actuators 46 preferably includes a plunger member 47 which engages the lower surface of the space vehicle 15. Once the pyrotechnic devices separate the releasable securing means 37 thereby severing the secure connection of the vehicles 15 to the platform 24, the actuators push and pivot the vehicles 15 relative to the mounting platform 24 and generally away from the inner portion 25 of the mounting platform 24. Alternatively, the spring actuators 46 may be any other suitable type of actuators such as gas actuators 46 provided with sufficient compressed gas energy therein to pivot the space vehicles 15. The actuators 46 are the preferred means for pivoting the vehicles 15 generally outwardly from the longitudinal axis of the missile 14 for ejection therefrom.

Figure 10:
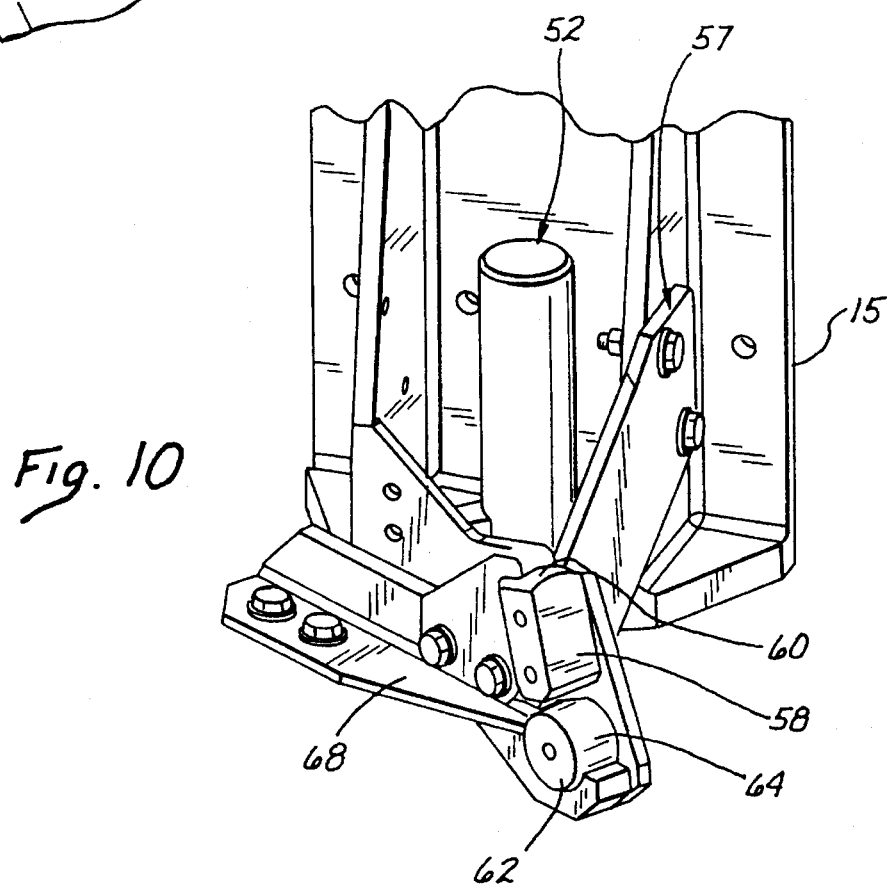
FIG. 10 is a perspective view of the detachable hinge shown connected to a portion of the mounting platform of the dispenser system of the present invention and to a portion of the space vehicle and illustrating the hinge in detail.
Figure 11A:
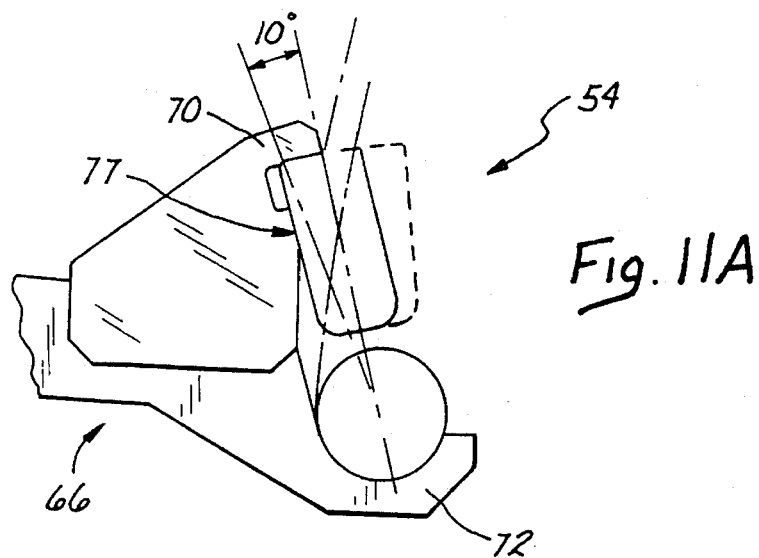
FIG. 11A is a side isometric view of the detachable hinge of the dispenser system of the present invention showing the cam block thereof in phantom when pivoted into a position allowing disengagement of the cam and cam guide of the detachable hinge.
Figure 11B:
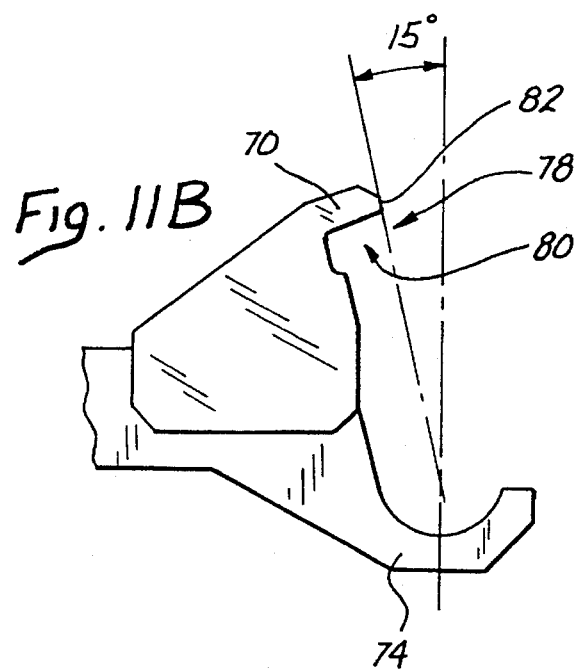
FIG. 11B is a side-isometric view of the detachable hinge of the dispenser system of the present invention similar to the depiction of FIG. 11A except that the cam is removed therefrom in order to more clearly illustrate the features of the cam guide.
Figure 12:
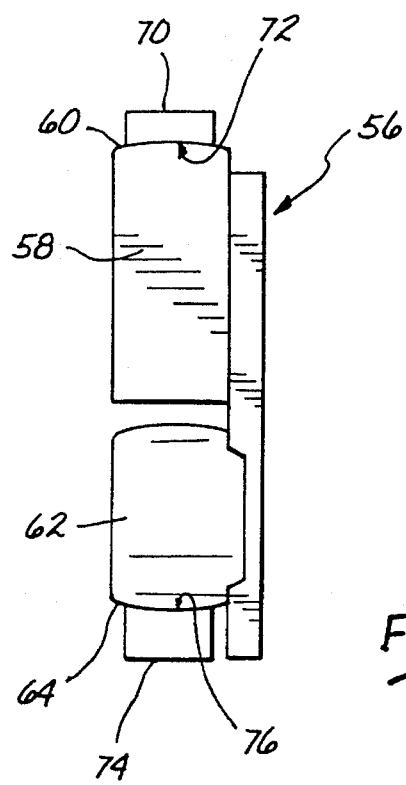
FIG. 12 is a front view of the cam guide, cam block and cam pivot of the detachably mounting means of the dispenser system of the present invention illustrating the spherically curved face portions of the cam block and cam pivot.

A means for detachably pivotally mounting 54 (FIG. 11A) is also provided which preferably detachably interconnects the mounting platform 24 to the space vehicle 15. The detachably mounting means 54 is essentially a detachable hinge 54 and preferably includes a cam 56 mounted on the space vehicle 15 by means of cam bracket 57 (FIG. 10). The detachably mounting means 54 also preferably includes a cam guide 62 mounted on the platform 24 preferably at outer portions 27 thereof by means of a cam guide bracket 68. The cam 56 includes a cam block 58 and a cam pivot 62 secured to the cam bracket 57. The cam block 58 and cam pivot 62 have faces 60 (at an upper portion thereof) and 64 (at a lower portion thereof). Faces 60 and 64 are generally outwardly sperically curved so that a plane tangent to the face 60 intersects the face 60 only at a single point, and a plane tangent to the face 64 intersects the face 64 only at a single point. The cam guide 66 includes a cam guide upper member 70 and a cam guide lower member 74 which have faces 72 (at an upper portion thereof) and 76 (at a lower portion thereof). Cam guide 66 and cam 56 are dimensioned so that cam guide upper member face 70 is generally in contact with cam block face 60 when the hinge 54 interconnects the space vehicle 15 and the mounting platform 24, and cam guide lower member face 76 is generally in contact with cam pivot face 64 when the hinge 54 interconnects the space vehicle 15 and the mounting platform 24. As with cam block faces 60 and 64, cam guide faces 72 and 76 are both outwardly spherically curved with the center of their radii of curvature at the center of the radii of curvature of the cam block face 60 and cam pivot face 64 in order to allow pivotal movement of the block 58 and pivot 62 within the cam guide 66. When the cam 56 and cam guide 66 are fitted together so that the cam block 58 is in a position of engagement with the cam guide upper member 70, the cam block 58 is preferably in contact with cam guide stop 77 which limits counterrotational movement of the cam 56 relative to the cam guide 66 and a portion of the cam block 58 occupies a partially enclosed portion or area 80 partially defined by the cam guide upper member 70 and stop 77, as shown in FIGS. 11A and 11B. In this position of engagement, the cam guide upper member edge portion 82 covers (or overlaps) a portion of the cam block face 60 while the cam guide lower member 74 covers a portion of the face 64 of the cam pivot 62 thereby generally precluding linear vertical movement of the cam 56 relative to the cam guide 66 and thus separation thereof. However, the faces 60, 64, 72 and 76 allow pivotal movement of the cam 56 relative to the cam guide 66 and thereby pivotal movement of the space vehicle 15 relative to the mounting platform 24. Thus, pivoting of the cam 56 approximately ten degrees relative to the cam guide 66 relatively orients the cam guide upper member 70 and cam block 58 so that the cam guide upper member 70 does not overlap the cam block face 60 and does not block generally vertical linear movement of the cam block 60, as shown in FIG. 11A. In this position of relative orientation, the cam block 58 is positioned generally in the cam guide upper member open area 78 and is thus disengaged from the cam guide upper member 70. Consequently, the cam 56 is free to move generally vertically linearly relative to the cam guide 66 thereby allowing separation thereof and concomitantly separation of the space vehicle 15 from the launch vehicle 14. Pivoting of the space vehicle 15 relative to the mounting platform 24 and about the axis of the hinge 62 (and concomitantly relative pivoting of the cam 56 and cam guide 66) is preferably accomplished by means of the spring actuator 46 after the separation of the means for releasably securing 37, as described hereinabove. In this way, the actuators 46 provide ejection of the vehicles 15 from the carrier 14, and the actuators 46 in conjunction with the means for releasably securing 37 and the detachably mounting means 54 provide separation of the vehicles 15 from the launch vehicle 14. In order to provide the space vehicle 15 with the desired angle of inclination at the point of separation from the mounting platform 24 and carrier 14, the cam guide 66 is orientated so that the cam guide upper member edge portion 82 is inclined outwardly approximately fifteen degrees relative to the longitudinal axis of the carrier 14, as shown in FIG. 11B.

Each space vehicle 15 preferably has a spring actuator 46 and the means for releasably securing 37 secures each space vehicle 15 to the platform 24 and may be activated independent of any other of the releasably securing means 37 securing the other space vehicles. Thus, any of the space vehicles 15 may be separated and ejected from the platform 24 even in the event of separation and/or ejection failure of any of the other space vehicles 15.

Accordingly, there has been provided, in accordance with the invention, a space vehicle dispenser which passively releases space vehicles from a launch vehicle and which is also relatively simple in construction and which has minimal power requirements. It is to be understood that all the terms used herein are descriptive rather than limiting. Although the invention has been described as applicable to space vehicles and launch vehicles and in conjunction with the specific embodiment set forth above, many alternative embodiments, modifications and variations will be apparent to those skilled in the art in light of the disclosure set forth herein. Accordingly, it is intended to include all such alternative embodiments, modifications and variations that fall within the spirit and scope of the invention as set forth in the claims hereinbelow.

What is claimed is:

1. A carrier having a dispenser for dispensing a vehicle therefrom, comprising:

a mounting platform for mounting the vehicle thereon;

an outer support structure secured to the carrier and secured to said mounting platform;

an inner support structure positioned generally within said outer support structure and secured to the carrier and to said mounting platform;

means for detachably mounting the vehicle on said platform; and means for pivotally and releasably securing the vehicle to said platform, the securing means causing the vehicle to pivot about the securing means when the vehicle is dispensed from the carrier;

wherein said support structures are dimensioned so that said mounting platform is positioned generally normal to a longitudinal axis of the carrier.

2. The carrier of claim 1 further including a means for pivoting the vehicle relative to said platform in order to detach and eject the vehicle therefrom.

3. The carrier of claim 1 wherein said platform includes a pair of struts extending radially from longitudinal axis of the carrier and generally positioned between edge portions of said outer and inner support structures.

4. The carrier of claim 1 further including a connection ring connected to lower edge portions of said outer and inner structures and to the carrier, said connection ring being generally rigid in order to enhance generally even distribution of point load forces transferred from said structures to the carrier.

5. The carrier of claim 1 wherein said platform is generally rigid in order to enhance generally even distribution of point load forces transferred from the vehicle to said structures.

6. The carrier of claim 1 wherein said means for detachably mounting includes a first member located at an upper circumferential portion of said mounting platform and a second member located at a lower portion of the vehicle.

7. The carrier of claim 1 further including a means for ejecting the vehicle from said mounting platform, said means for ejecting being secured to said mounting platform and positioned between said mounting platform and the vehicle when the vehicle is mounted thereon.

8. The carrier of claim 6 when said means for releasably securing includes a set of separation nuts and a set of separation bolts interconnecting said vehicle and said mounting platform.

9. The carrier of claim 1 wherein said inner support structure is an inner truncated cone.

10. The carrier of claim 1 wherein said outer support structure is an outer truncated cone.

11. A dispenser system for dispensing a vehicle from a carrier, comprising:

a generally rigid mounting platform;

a hinge for detachably and pivotally mounting the vehicle on said mounting platform;

an outer support structure secured at a lower end portion thereof to the carrier and secured at an upper end portion thereof to said mounting platform;

an inner support structure positioned generally within said outer support structure and secured at a lower end portion thereof to the carrier; and a means for releasably and pivotally securing said mounting platform to the vehicle, said means generally preventing relative pivoting between said mounting platform and the vehicle when the vehicle is secured to said mounting platform;

wherein said mounting platform includes struts extending radially from a longitudinal axis of the carrier and generally positioned between edge portions of said inner and outer support structures.

12. The dispenser of claim 11 wherein said hinge is a pair of hinges rotatably interconnecting said mounting platform and the vehicle.

13. The dispenser of claim 11 wherein said hinge includes a first member connected to an upper circumferential portion of said mounting platform and a second member connected to a lower portion of the vehicle, said first member detaching from said second member upon a selected degree of relative pivoting between said first member and said second member.

14. The dispenser of claim 11 and further including a means for pivoting the vehicle relative to said mounting platform in order to separate and eject the vehicle from said mounting platform.

15. The dispenser of claim 11 wherein said means for pivoting includes a spring actuator mounted on said mounting platform, said spring actuator having a plunger member engaging the vehicle at a lower portion thereof.

16. The dispenser of claim 11 wherein said means for releasably and pivotally securing the vehicle on said mounting platform includes a first set of separation nuts, a first set of separation bolts, a second set of separation nuts and a second set of separation bolts interconnecting said mounting platform and the vehicle.

17. The dispenser of claim 11 wherein said inner support structure is an inner upright truncated cone.

18. The dispenser of claim of 11 wherein said outer support structure is an outer inverted truncated cone.

19. The dispenser of claim 11 wherein said support structures are dimensioned so that said mounting platform is positioned generally normal to longitudinal axis of the carrier.

20. A dispenser system for dispensing a plurality of vehicles from a carrier, comprising:

a generally rigid mounting platform having a central portion;

a plurality of hinges detachably and pivotally mounting each of the plurality of vehicles onto the mounting platform, at least one of the plurality of hinges pivotally mounting a corresponding one of each of the plurality of vehicles onto the mounting platform;

an outer support structure comprising an outer inverted cone and being secured at a lower end portion thereof to the carrier and secured at an upper end portion thereof to said mounting platform;

an inner support structure positioned generally within said outer support structure and secured at a lower end portion thereof to the carrier; and means for pivotally releasing each of the plurality of vehicles from the mounting platform, the pivotal releasing means causing a rotational axis of each of the plurality of vehicles to be pivoted away from the central portion when released.

21. The dispense system according to claim 20, wherein the generally rigid mounting platform further comprises a peripheral area, which surrounds the central portion, and wherein the plurality of hinges are disposed around the peripheral area.

* * * * *